United States Patent
Jeanton et al.

(10) Patent No.: US 10,345,125 B2
(45) Date of Patent: Jul. 9, 2019

(54) SYSTEM FOR ATTACHING A FUNCTIONAL MEASUREMENT OR DETECTION BODY TO A VEHICLE BODYWORK PART

(71) Applicant: Compagnie Plastic Omnium, Lyons (FR)

(72) Inventors: Raphael Jeanton, Saint-Jean-le-Vieux (FR); Faicel Bourennane, Montalieu Vercieu (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/029,032

(22) PCT Filed: Oct. 7, 2014

(86) PCT No.: PCT/FR2014/052544
§ 371 (c)(1),
(2) Date: Apr. 13, 2016

(87) PCT Pub. No.: WO2015/055918
PCT Pub. Date: Apr. 23, 2015

(65) Prior Publication Data
US 2016/0258789 A1    Sep. 8, 2016

(30) Foreign Application Priority Data

Oct. 15, 2013  (FR) ...................................... 13 60000

(51) Int. Cl.
*G01S 7/521*     (2006.01)
*G10K 9/22*      (2006.01)
(Continued)

(52) U.S. Cl.
CPC ............ *G01D 11/30* (2013.01); *B60R 19/483* (2013.01)

(58) Field of Classification Search
CPC ........ B62D 27/00; B62D 25/00; B62D 29/00; B62D 27/02; B62D 29/04; B62D 35/02;
(Continued)

(56) References Cited

U.S. PATENT DOCUMENTS 6,203,366 B1    3/2001   Muller et al.
6,279,210 B1    8/2001   Faass et al.
(Continued)

FOREIGN PATENT DOCUMENTS

DE     19939747 A1     3/2001
EP     1048524 A1     11/2000
(Continued)

OTHER PUBLICATIONS

International Search Report PCT/ISA/210 for International Application No. PCT/FR2014/052544 dated Jan. 23, 2015.
(Continued)

*Primary Examiner* — Harshad R Patel
*Assistant Examiner* — Brandi N Hopkins
(74) *Attorney, Agent, or Firm* — Harness, Dickey & Pierce, P.L.C.

(57) ABSTRACT

A system configured to attach a functional measurement or detection body to a vehicle bodywork part, the system including a support having a means for attaching to the functional body, and an interface configured to fasten the support to the bodywork part, the support and the fastening interface being assembled and fitted to one another using grooves.

12 Claims, 2 Drawing Sheets

(51) Int. Cl.
  *B60R 19/24* (2006.01)
  *G01D 11/30* (2006.01)
  *B60R 19/48* (2006.01)
(58) Field of Classification Search
  CPC ... B62D 35/005; B62D 25/24; Y10T 403/217; Y10T 292/0825; Y10T 403/60; Y10T 24/44017; Y10T 24/44034; B60J 5/0481; B60S 1/528; B60Q 9/006; G01S 7/521; G01S 2015/938; G01S 15/931; B60R 19/483; G01D 11/30; F16B 9/023
  USPC .................. 73/866.5; 293/155, 117; 342/70
  See application file for complete search history.

(56) References Cited

U.S. PATENT DOCUMENTS

| | | | |
|---|---|---|---|
| 6,340,187 B1 | 1/2002 | Villiere et al. | |
| 7,522,474 B2* | 4/2009 | Nakajima | G01S 7/521 367/140 |
| 8,226,133 B2* | 7/2012 | Sano | B60R 19/24 293/121 |
| 2007/0277569 A1* | 12/2007 | Vitali | B62H 5/003 70/233 |
| 2007/0296184 A1* | 12/2007 | Oestergren | B60R 21/213 280/728.2 |
| 2010/0127697 A1 | 5/2010 | Storrie et al. | |

FOREIGN PATENT DOCUMENTS

| | | |
|---|---|---|
| FR | 2715458 A1 | 7/1995 |
| WO | WO-2012/175475 A2 | 12/2012 |

OTHER PUBLICATIONS

Written Opinion of the International Searching Authority PCT/ISA/237 for International Application No. PCT/FR2014/052544 dated Jan. 23, 2015.

French Search Report and Written Opinion for French Application No. FR 1360000 dated May 13, 2014.

European Office Action for corresponding European Application No. 14790231.6 dated Feb. 12, 2018.

* cited by examiner

SYSTEM FOR ATTACHING A FUNCTIONAL MEASUREMENT OR DETECTION BODY TO A VEHICLE BODYWORK PART

CROSS-REFERENCE TO RELATED APPLICATIONS

This application is the U.S. National Phase application of PCT Application No. PCT/FR2014/052544 filed on Oct. 7, 2014, which claims priority to French Application No. 1360000 filed on Oct. 15, 2013, the contents of each of which are incorporated herein by reference.

BACKGROUND

Field

The invention relates to the technical field of external vehicle bodywork parts comprising functional bodies, such as sensors and detectors. In particular, the invention relates to systems for attaching these bodies to the bodywork parts.

Description of Related Art

Systems for attaching detectors on bodywork parts, such as a motor vehicle bumper, are known. These systems consist of a single part: a part for immobilizing the detector, fastened to the bumper, usually by welding (ultrasound). The detector is generally clipped into this part. The parts (attachment system and detector) are assembled along the main axis of the detector.

Currently, car manufacturers are integrating an increasing number of functional bodies to external bodywork parts.

Each functional body, parking sensors, blind spot sensor system, temperature detector, etc. has a different shape. In addition, for a given type of body, the shapes of the attachment system vary depending on the body manufacturer or on the vehicle. The interface part attached to the bumper must therefore be manufactured for a specific type of body.

Furthermore, bumpers have several parking sensors. Due to the curved shape of the bumper, the parts attached thereto must have different shapes depending on their position on the bumper, to follow the local curve. It is in fact essential to follow the local curve so that the sensor is perfectly positioned and oriented precisely to perform its function. Otherwise, the measurement will be approximate, which is not acceptable for this type of sensor.

SUMMARY

The invention overcomes these constraints, by separating the function of immobilizing the functional body (e.g. clipping) from the function of attachment to the bodywork part.

The invention therefore relates to a system (1) for attaching a functional measurement or detection body (2), also referred to herein as a functional body (2), to a vehicle bodywork part (3), in order to overcome these constraints. It comprises a support (4) having a means for attaching to the functional body (2), and an interface (5) for fastening the support (4) to the bodywork part, the support (4) and the fastening interface (5) being assembled and fitted to one another using grooves.

This design in two separate parts instead of one, is contrary to the habits of the designers. It is well known in fact that plastic can be used to mould complex shapes in order to combine several functionalities on a single part. The fact of using a single part usually makes the process simpler and above all it reduces costs.

However, this system offers an advantage since the support (4) can be standard for a given functional body (2), while only the fastening interface (5) will be specific depending on its position on the curved bodywork part (3), which varies depending on the type of vehicle. In addition, this reduces tooling costs since only the tooling of the fastening interface (5) has to be made depending on the connecting surface shapes, which match the curve of the bodywork part (3).

This system offers another advantage since only the support (4) can be modified if required for example to change functional body (2) or supplier for a given type of functional body.

Lastly, a final advantage concerns the equipment development step. Before going into production, the attachment system must be tested to ensure that it meets all the conditions for proper operation, including the exact positioning of the sensors once mounted on the bodywork part (3), the assembly forces and the resistance to penetration. Since the support (4) is common and therefore a standard supply for all sensors of a particular type, regardless of the vehicle, its development only has to be carried out once, when producing the tooling to validate its interfaces with the corresponding sensor: when reused on another vehicle, since the support has already been developed, only the fastening interface (5) has to be developed, since it is specific to each vehicle, due to the curves. From one vehicle to the next, the work involved in developing the various components is therefore halved, since only the curved interface of the sole has to be developed with respect to the bodywork part (3).

According to one embodiment, the support (4) and the fastening interface (5) comprise bodies (8, 9) cooperating with each other to withstand penetration forces preferably greater than 10 daN, said bodies consisting firstly of at least two insertion fins (8) and secondly of grooves (9) of corresponding shape.

The insertion fins (8) and the grooves (9) can be circular. In this case, the insertion fins (8) and the grooves (9) preferably have an angular assembly stroke of between 45° and 10°, preferably between 25° and 15°.

According to the invention, the insertion fins (8) and the grooves (9) can slide with substantially negative clearance, or preferably with substantially zero clearance.

According to one embodiment, the fastening interface (5) comprises a sole (10) equipped with:
- a means (11) for guiding the insertion fins (8) in the grooves (9) of the support (4) to a final operating position;
- a means (12) for locking the support (4) in this position.

According to this embodiment, the sole (10) may comprise a circular hole (13) with on its circumference:
- at least two L-shaped grooves (9) overhanging the insertion fins (8) in the position, so as to prevent the insertion fins (8) from being pulled out when they are engaged in the two L-shaped grooves (9);
- at least one notch (12) cooperating with at least one projection (14) carried by the base of the support (4), to hold the insertion fins (8) in said position;
- at least one stop (15) to stop the rotational movement of the insertion fins (8) in said position, said stop (15) being positioned, preferably, between two successive grooves (9).

According to the invention, the functional body (2) and the support (4) can be assembled and fitted to one another using grooves.

For example, the support (4) and the functional body (2) can comprise means cooperating with each other to withstand penetration forces preferably greater than 10 daN, said bodies being firstly at least two insertion fins, and secondly grooves of corresponding shape.

According to one embodiment, the insertion fins and the grooves are circular.

The invention also relates to an external bodywork part (3) comprising a system (1) for attaching a functional body (2) according to the invention.

According to the invention, the fastening interface (5) can be attached by welding, bonding, gluing, clipping, screwing or riveting. The fastening interface (5) can also be injection molded with the external bodywork part (3).

The invention also relates to a method for assembling a functional body on an external vehicle bodywork part, using an attachment system according to the invention, wherein the following steps are performed:
  a—The fastening interface is attached to the bodywork part;
  b—The functional body is immobilized in the support; and
  c—the support is inserted and locked in the fastening interface.

Finally, according to the invention, the fastening interface can be overmoulded with the bodywork part.

BRIEF DESCRIPTION OF THE DRAWINGS

The invention will be better understood on reading the following description, referring to the accompanying drawings in which.

DETAILED DESCRIPTION

Figure 1:
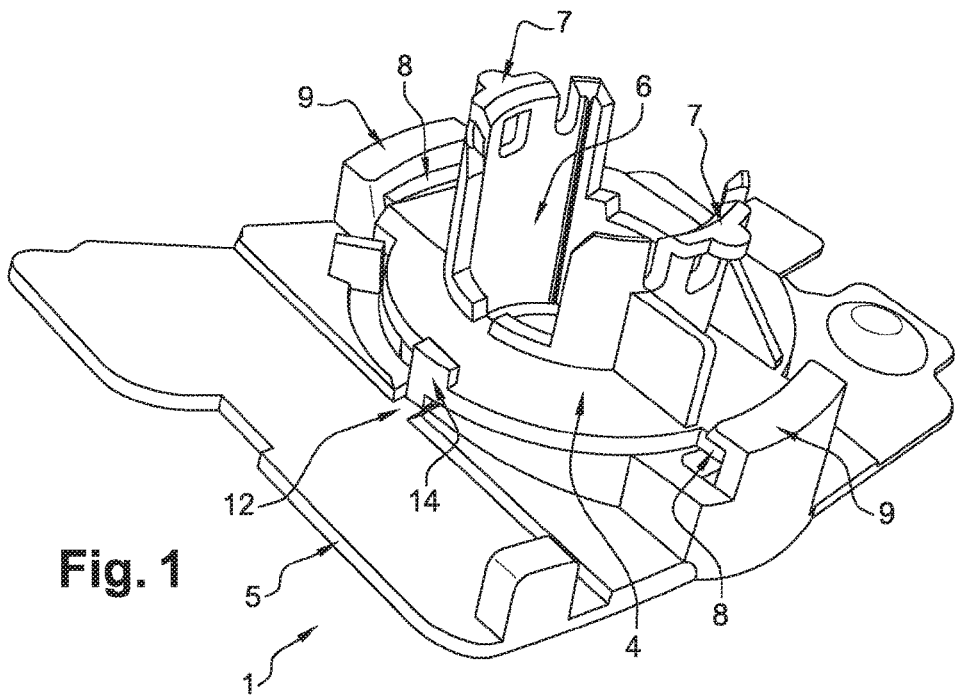
FIG. 1 shows a system (1) for attaching a functional body according to the invention.
Figure 4:
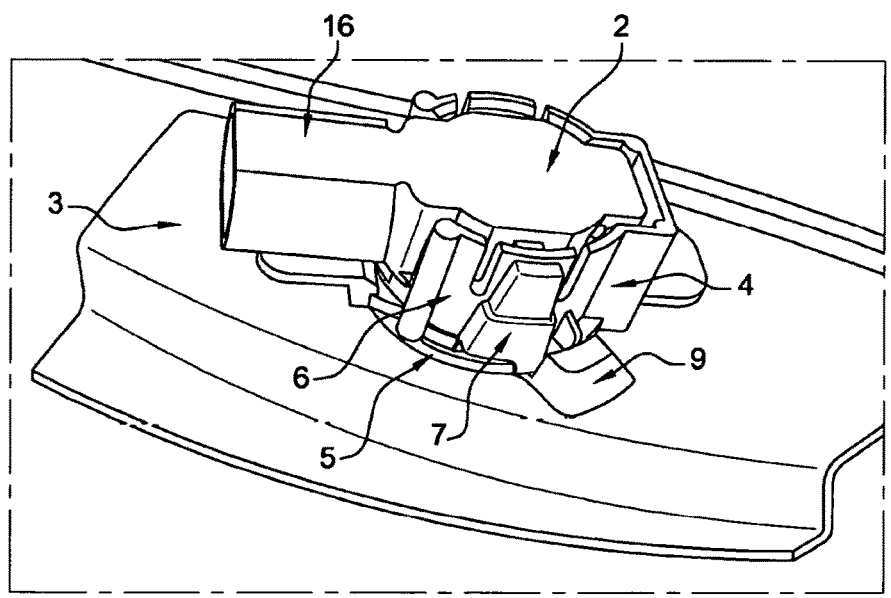
FIG. 4 shows an attachment system (1) in position on a bodywork part (3) with the functional body (2).

We now refer to FIGS. 1 and 4 which show an embodiment, according to the invention, of a system (1) for attaching a functional measurement or detection body (2) to a vehicle bodywork part (3).

The functional bodies (2) may be parking sensors, blind spot system sensors, sensors for measuring the available space, temperature detectors, etc.

The bodywork part (3) can be a wing, the roof, an opening (door or tailgate) or any component of the bumper (the skin, the air inlet grille, a trim, etc.).

The remainder of the description describes an embodiment in which the functional body is a parking sensor, and the bodywork part is the skin of a vehicle bumper.

This system (1) for attaching a functional body (2) comprises a support (4) provided with a means for attaching to the functional body (2), and an interface (5) for fastening the support (4) to the bodywork part (3). The support (4) and the fastening interface (5) are assembled and locked to each other using grooves.

Preferably, to minimize the vehicle weight, the support (4) and the fastening interface (5) are made of plastic, preferably thermoplastic. The support (4) and the fastening interface (5) can be made of different materials.

Figure 2:
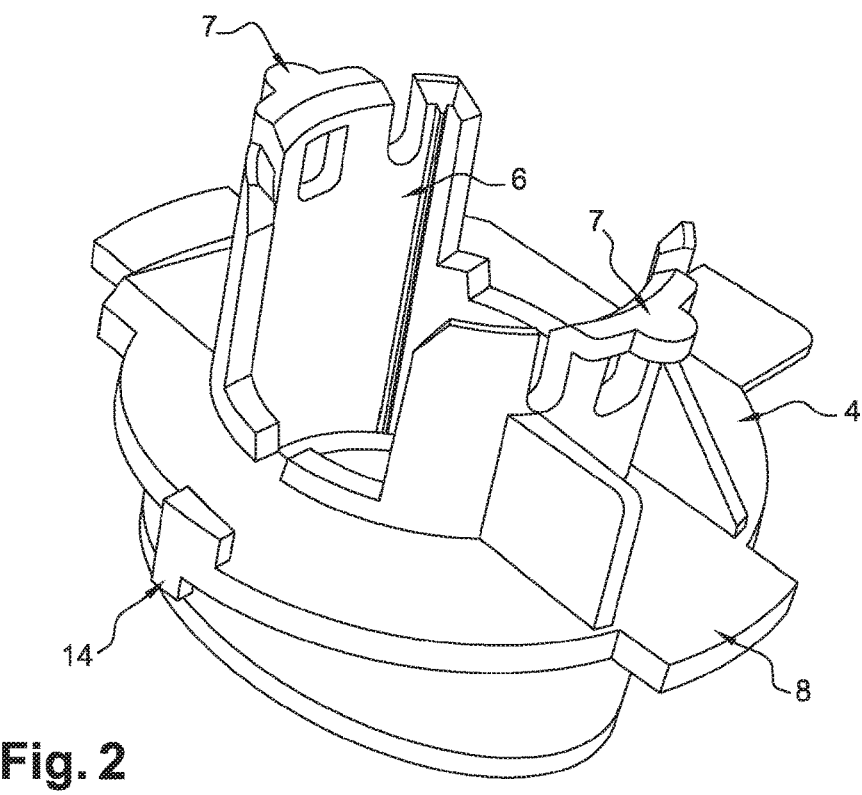
FIG. 2 shows a support (4) of the attachment system (1) according to the invention.

Referring to FIG. 2, the support (4) may include a housing (6) adapted to receive the functional body (2) therein and a means (7) for immobilizing the functional body (2) in the housing (6). The immobilizing means (7) may be:
  a system for clipping the body in the support as shown on FIGS. 1, 2 and 4. On this figure, the clipping system comprises two clips (7) oriented along the axis of the chimney; it is preferably adapted to provide a force less than 5 daN, preferably less than 3 daN, and ideally less than 1 daN for clipping the functional body in the support;
  a circular groove system; it is preferably adapted to provide a force less than 5 daN, preferably less than 3 daN, and ideally less than 1 daN (force applied on a body to rotate it) to rotate the functional body in the support; or
  a screw.

If a circular groove system is used, the notion of force exerted is specified below. Depending on the assembly ergonomics and the operator's movements (number (N) of fingers used to apply the torque required for assembly by rotation), we obtain an equivalent force applied on N bearing areas of the sensor and/or of the support, and therefore the equivalent force on each of the operator's fingers.

Taking the low assumption (when the operator's finger must not undergo a local axial force greater than 1 daN), and if the bearing areas are about 2 cm from the axis of rotation, the torque applied for a movement with two fingers (thumb+forefinger opposite each other on two diametrically opposed bearing areas) is: (2×1 daN)*2 cm=0.4 Nm If the acceptable force is 3 daN but with a force distributed on three bearing areas at 120° at a distance of 1.5 cm from the axis of rotation, the torque applied is: (3×3 daN)*1.5 cm=1.35 N·m Taking the high assumption but still with two fingers pressing with 5 daN at a distance of 2 cm from the axis, the torque applied is 2 N·m The greater the forces applied the greater the risks for the operator (MSD, arduousness, etc.), but the "tighter" the assembly will be in the groove, either with a substantially zero clearance, or with a substantially negative clearance.

Those skilled in the art will know how to optimize the design according to the maximum forces acceptable for the operator (legislation depending on the countries, corporate internal rules, specifications, etc.), the number of bearing areas (fingers used in the movement), the distance from the bearing areas to the axis of rotation, etc.

Figure 3:
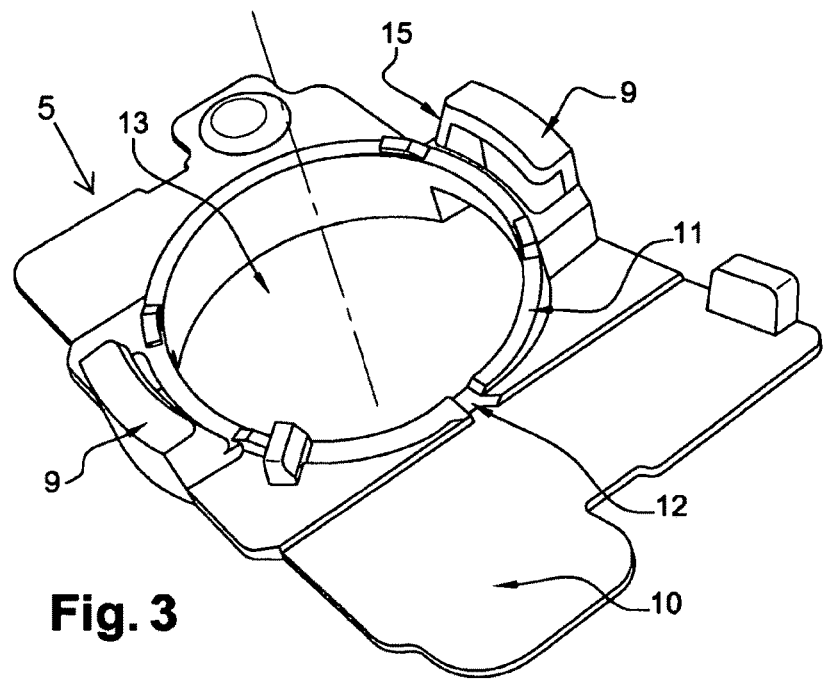
FIG. 3 shows an interface (5) for fastening the attachment system (1) according to the invention.

Referring also to FIG. 3, the support (4) and the fastening interface (5) comprise bodies (8, 9) of complementary shapes (male/female type) and cooperating with each other to prevent the support (4), immobilizing the sensor (2), from separating from the fastening interface (5) when it undergoes an axial force, in particular from the outside towards the inside of the vehicle (penetration force).

These bodies (8, 9) cooperating with each other to withstand penetration forces can be firstly at least two insertion fins (8), and secondly at least two grooves (9) of corresponding shape, the insertion fins (8) engaging in the grooves (9).

The insertion fins (8) and the grooves (9) can be straight. In this case, engagement is carried out by making a transverse movement until locking with respect to the final assembly position.

The insertion fins (8) and the grooves (9) can be straight at the start of the stroke, then circular, or vice versa.

Preferably, the insertion fins (8) and the grooves (9) are circular (FIGS. 1 to 4). In this case, engagement is carried out by a rotational movement. The insertion fins (8) have an angular assembly stroke (displacement) in the grooves (9) of between 45° and 10°, preferably between 25° and 15°.

For the insertion fins (8) and the grooves (9) to remain fully engaged one inside the other, to avoid any residual clearance in assembled position causing vibrations, or poor perceived quality, or poor precision when positioning the functional body, etc.), they can slide with substantially zero clearance. In this case, the insertion fins (8) and the grooves (9) have, and preferably, at least one entry chamfer (not shown).

The chamfer can be on the groove (9) or on the insertion fin (8). The insertion fins (8) can be carried by the support (4) and the grooves (9) on the fastening interface (5), or vice versa.

Thus, according to one embodiment (FIGS. 2 and 3), the support (4) comprises on its outer side at least two insertion fins (8). These insertion fins (8) cooperate, by engaging therein, with grooves (9) of corresponding shape located on the fastening interface (5).

According to one example of this embodiment (FIGS. 2 and 3), the fastening interface (5) comprises a sole (10) equipped with:
 means (11), for guiding towards a final operating position, the insertion fins (8) in the grooves (9) of the support (4); according to one embodiment, this guiding means (11) is a groove of which one part forms the insertion groove (9);
 a means (12) for locking the support (4) in this position.
The sole (10) may comprise for example a circular hole (13) with on its circumference:
 at least two L-shaped grooves (9) overhanging the insertion fins (8) in the position, so as to prevent the insertion fins (8) from being pulled out when they are engaged in the two L-shaped grooves (9); the two groves preferably being diametrically opposed;
 at least one notch (12) cooperating with at least one projection (14) carried by the base of the support (4) to keep the fins (8) in engagement position locked in said position; said notch (12) being positioned at an equal distance from the two L-shaped grooves (9);
 at least one stop (15) to stop the rotational movement of the insertion fins (8) in said position, said stop (15) being positioned, preferably between two successive grooves (9).

According to another embodiment (not shown), the insertion fins (8) are on the fastening interface (5) and the grooves (9) are on the support (4).

According to yet another embodiment (not shown), the functional body (2) and the support (4) are assembled using the same assembly system as between the support (4) and the fastening interface (5).

This embodiment eliminates a problem of antagonistic forces to which the parts are subjected and which are described below.

First, the force required to assemble the sensor (2) on the attachment system (1) must be less than 1 daN, to avoid generating MSD (musculoskeletal disorders) in the operators responsible for this assembly operation.

Secondly, the attachment system (1) must withstand penetration forces of about 10 daN. The aim being that the sensor (2) does not separate from the attachment system (1). These penetration forces correspond to a force exerted, directly or indirectly, on the support (4), the fastening interface (5) or the sensor (2) of the bumper (3) from the outside, and along the axis of the attachment system (1).

Thus, the direction and value of the two forces, assembly force and penetration force, are antagonistic.

According to this embodiment, which overcomes these constraints, the means for attaching the functional body (2) is a groove system: the support (4) and the functional body (2) comprise means cooperating with each other to withstand penetration forces preferably greater than 10 daN. These means may be firstly at least two insertion fins, and secondly grooves of corresponding shape. These insertion fins and the grooves can be straight or circular. The insertion fins and the grooves slide preferably with substantially zero clearance. If they are circular, the assembly force is a pressing force on a surface used to rotate the functional body in the support (4).

With this system, the parts can be configured to respect simultaneously the minimum penetration and maximum assembly constraints.

Obviously, with this type of immobilization system, the support (4) and the fastening interface (5) should preferably have bodies (8, 9) of complementary shape (male/female type) and cooperating with each other to withstand penetration forces preferably greater than 10 daN (FIGS. 2 and 3). Thus, it is the entire system which withstands penetration forces preferably greater than 10 daN, while being adapted to provide an assembly force less than 1 daN.

The invention also relates to an external bodywork part (3) comprising a system (1) for attaching a functional body (2) according to the invention.

The fastening interface (5) is attached to this bodywork part (3) by welding, bonding, gluing, clipping, screwing or riveting. The fastening interface (5) can also be injection molded with the external bodywork part (3), as shown on FIG. 4.

The invention also relates to a method for assembling a functional body on an external vehicle bodywork part using an attachment system according to the invention.

The method comprises the following steps, the execution order is indifferent:
 a—The fastening interface is attached to the bodywork part;
 b—The functional body is immobilized in the support; and
 c—The support is inserted and locked in the fastening interface.

The preferred order is a, then b, then c. This embodiment offers several advantages:
 the fastening interface can be overmoulded on the bodywork part (FIG. 4);
 the connection base (16) of the functional body, connected to the wiring harness, provides the operator with a lever arm, or a bearing surface, to immobilize the functional body in the support, and/or to insert and lock the support in the fastening interface.

The invention claimed is:

1. A system for attaching a functional body to a vehicle bodywork part, wherein the system comprises:
 a support attached to the functional body via an attachment including at least two insertion fins, the at least two insertion fins fixed to the support; and
 a fastening interface configured to fasten said support to the vehicle bodywork part, the fastening interface including circular grooves of a shape corresponding to a shape of the at least two insertion fins, the circular grooves fixed to the fastening interface, said support and said fastening interface being assembled and fitted to one another via an engagement of the at least two insertion fins in the circular grooves, wherein the engagement of the at least two insertion fins in the circular grooves is carried out by a rotational movement, wherein the at least two insertion fins and the circular grooves have complementary shapes, such that the at least two insertion fins each have a male-type shape and the circular grooves each have a female-type shape.

2. The system according to claim 1, wherein the support and the fastening interface comprise bodies cooperating with each other to withstand penetration forces greater than 10 daN, said bodies including at least two insertion fins and the circular grooves corresponding thereto.

3. The system according to claim 2, wherein the at least two insertion fins and the circular grooves have an angular assembly stroke of between 45° and 10°.

4. The system according to claim 2, wherein the at least two insertion fins and the circular grooves slide with negative clearance.

5. The system according to claim 2, where the fastening interface comprises a sole including:
  a guiding device configured to guide the at least two insertion fins in the circular grooves to a final operating position;
  a locking device configured to lock the support in the final operating position.

6. The system according to claim 5, wherein the sole includes a circular hole on a circumference thereof and further comprises:

at least two L-shaped grooves overhanging the at least two insertion fins in the final operating position, the at least two L-shaped grooves being configured to prevent the at least two insertion fins from being pulled out when engaged in the at least two L-shaped grooves;

at least one notch cooperating with at least one projection carried by a base of the support to hold the at least two insertion fins in said final operating position;

at least one stop configured to stop a rotational movement of the insertion fins in said final operating position, said stop being between two successive grooves.

7. The system according to claim 1, wherein the functional body and the support are assembled and fitted to one another using the circular grooves.

8. The system according to claim 7, wherein the support and the functional body are configured to cooperate with each other to withstand penetration forces greater than 10 daN via at least two insertion fins and the circular grooves of corresponding shape.

9. The system according to claim 8, wherein the at least two insertion fins are circular.

10. The system according to claim 1, wherein the fastening interface is attached by welding, bonding, gluing, clipping, screwing or riveting.

11. The system according to claim 1, wherein the fastening interface is injection molded with the vehicle bodywork part.

12. The system of claim 1, wherein the circular grooves include at least one recess.

* * * * *

UNITED STATES PATENT AND TRADEMARK OFFICE
CERTIFICATE OF CORRECTION

PATENT NO. : 10,345,125 B2  
APPLICATION NO. : 15/029032  
DATED : July 9, 2019  
INVENTOR(S) : Raphael Jeanton and Faicel Bourennane Page 1 of 1

It is certified that error appears in the above-identified patent and that said Letters Patent is hereby corrected as shown below:

On the Title Page

Item (71) Assignee should read as follows:  
Compagnie Plastic Omnium, Lyon (FR)

Item (73) Applicant should read as follows:  
Compagnie Plastic Omnium, Lyon (FR)

Signed and Sealed this  
Twenty-eighth Day of April, 2020

Andrei Iancu  
*Director of the United States Patent and Trademark Office*